Feb. 15, 1927.
H. A. FRETTS
1,618,000
TRAILER AND POWER UNIT FOR SOIL PULVERIZERS
Filed Sept. 8, 1925     2 Sheets-Sheet 1
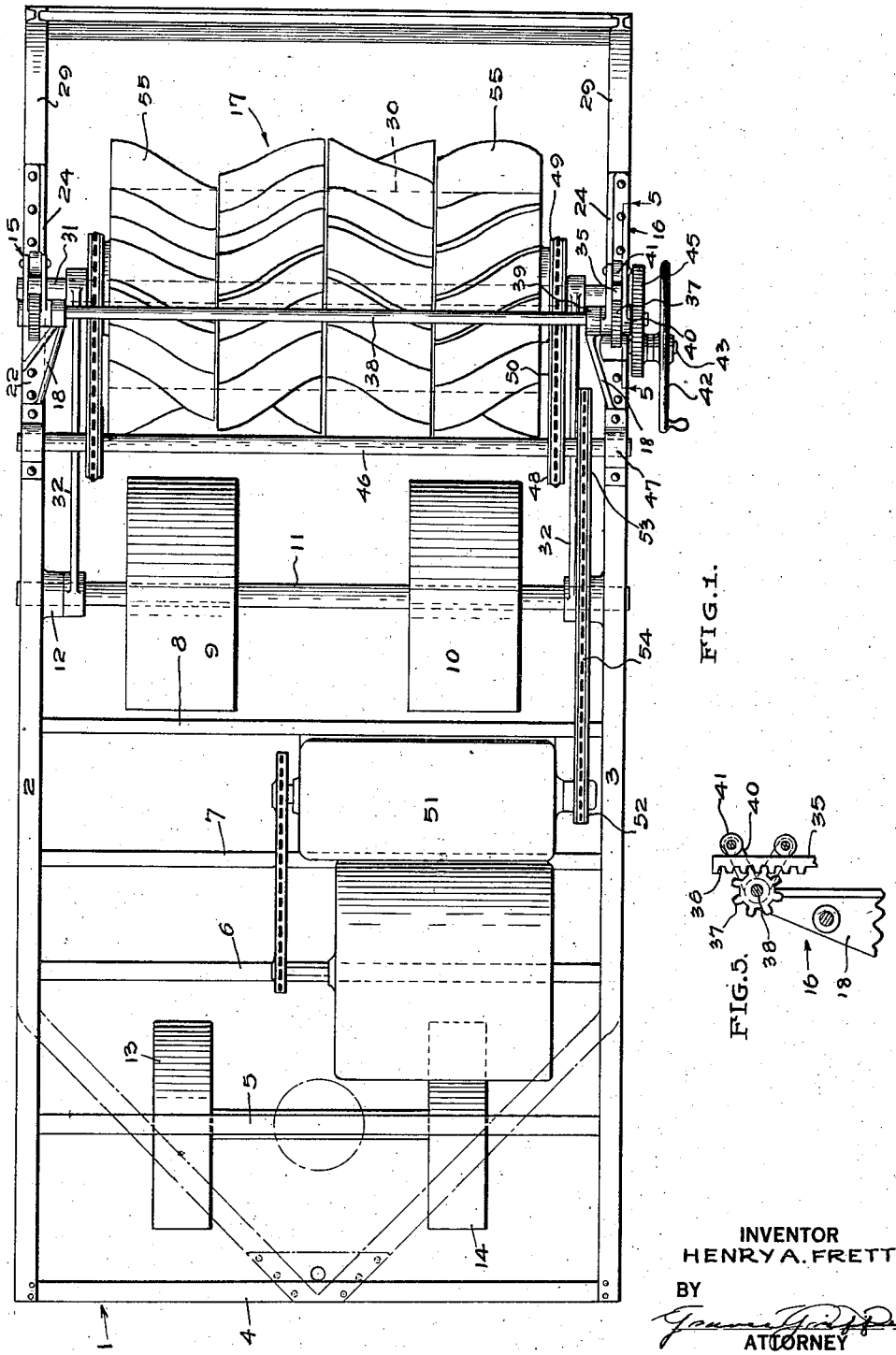
INVENTOR
HENRY A. FRETTS.
BY
ATTORNEY

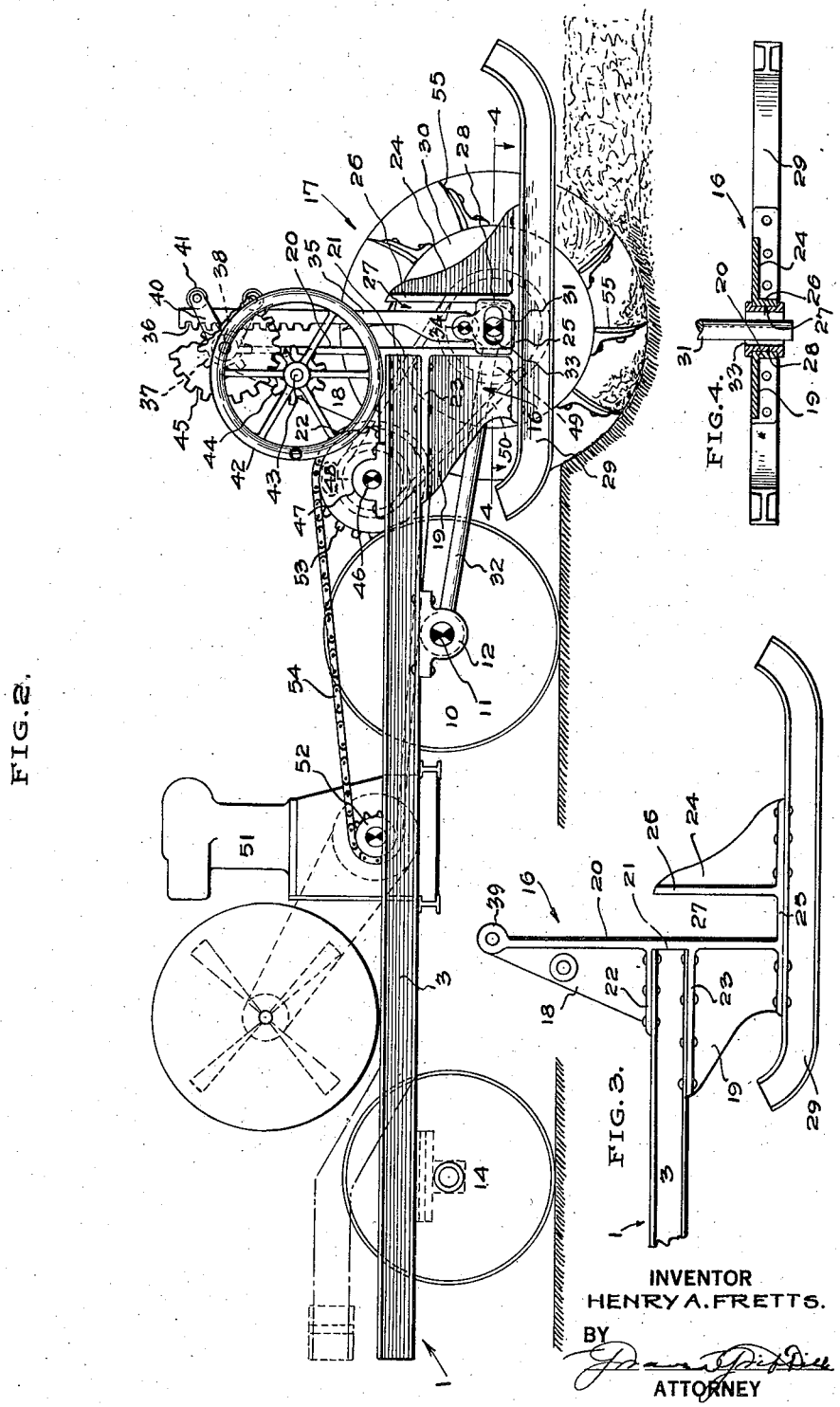

Patented Feb. 15, 1927.

1,618,000

UNITED STATES PATENT OFFICE.

HENRY A. FRETTS, OF SACRAMENTO, CALIFORNIA.

TRAILER AND POWER UNIT FOR SOIL PULVERIZERS.

Application filed September 8, 1925. Serial No. 54,865.

This invention relates to tractor-trailer power-units for rotary soil-pulverizers and comprises, in a general way, a means for mounting and operating a soil-pulverizer such as that shown and described in my co-pending application for rotary plowshare pulverizers, filed January the 5th, 1925.

The present application is intended to cover the trailer proper and the arrangement as borne thereby of the several co-related mechanisms constituting the rotary pulverizer mountings, the driving means, means of adjustment for regulating the cutting depth of the helicoidal blades carried by the rotor and constituting the rotary pulverizer, and runners as aids in passing over yielding surfaces.

In practice it has been found to be the better arrangement to attach the trailer thus equipped directly to the tractor, rather than to have the tractor carry this element as an integral unit, as there is thus provided a much more flexible combination, as well as one permitting the detachment of the tractor and its application to diverse uses in other directions.

The principal object of my invention is the provision of a two, or more, wheeled trailer adapted for attachment to a tractor, or the like, and bearing a rotary soil-pulverizer, together with a power-unit adapted for the operation of said rotary pulverizer.

A further object is the provision, in a device of the character described, of a trailer adapted for the convenient mounting of a rotary soil-pulverizer and bearing adjusting means for the regulation of the depth of cut of the rotor borne blades, or cutters, as well as means for the prevention of the rotary pulverizer sinking beyond its adjusted cutting depth.

An additional object is the provision of a trailer of this character having its rear wheels so positioned within the cutting line of the rotary pulverizer that said wheels will at all times be supported upon the firmer earth.

Other objects and advantages will appear as this specification progresses and be more clearly set forth in the claims hereto appended.

In the accompanying drawings, forming a part of this specification, and in which similar characters of reference refer to like parts, throughout,—

Figure 1 is a top plan view of a trailer embodying the principles of my invention, in which a four wheel construction is shown in full lines, the dot-and-dash lines indicating the shape of the forward end of the trailer when the front wheels are removed;

Figure 2 is a side elevation, showing the trailer frame, pulverizer mounting and adjusting means therefor, and the power unit for driving the pulverizer;

Figure 3 is a detail view of the rear end of the trailer frame, showing one of the frames bearing the cross-head guide-ways and runner;

Figure 4 is a horizontal sectional detail taken through one of the pulverizer guide frames and cross-head bearings for the pulverizer shaft, and indicated on line 4—4 of Figure 2; and Figure 5 is a sectional detail, showing the pinion and rack mechanism for adjusting the depth of cut of the pulverizer, the section being taken on line 5—5 of Figure 1.

The embodiment shown in the drawings comprises a rectangular frame 1 of I-beam, or like construction having side members 2 and 3 and spacing braces 5, 6, 7 and 8 at the forward end of the frame. The frame 1 is supported by means of a pair of main supporting wheels 9 and 10 mounted upon axle 11 and connected to the under side of the I-beam side members by bearings 12. The forward end of the frame is preferably supported by a pair of steering wheels 13 and 14 adapted for connection to a tractor (not shown).

The forward extremities of the side frames 2 and 3 may be bent upwardly and drawn together, as shown in dot-and-dash lines in Figures 1 and 2, and connected to the rear frame of the tractor by means of a king-pin, and the front tractor wheels removed, if desired. The extremities of the I-beams 2 and 3 are provided with oppositely disposed guide-frames 15 and 16 serving as means for the adjustable support of the pulverizer 17. The guide-frames are preferably forged or cast and comprise upwardly extending brackets 18 and oppositely disposed brackets 19 connected by means of reinforcing ribs 20 and provided with rectangular openings 21 bearing marginal flanges 22 and 23, said openings being adapted to receive the ends of the I-beam side members 2 and 3 of the frame, to which the flanges 22 and 23 are securely riveted. Brackets 24 are connected to the brackets 19 by the bottom flanges 25 and extend in parallelism therewith and are provided with ribs 26, the ribs 20 and 26 of the brackets 18 and 24 respectively forming guide-ways 27 adapted to receive the cross-head bearing-blocks 28.

Runners 29 are securely riveted to the under sides of the bottom flanges 25 and normally rest slightly above the ground level, Figure 2, unless the wheels 9 and 10 sink into the ground, when they contact the ground preventing further sinking and operate to maintain the pulverizer at the required adjusted cutting depth. The rotor drum 30 is mounted upon a shaft 31 borne by the cross-head bearing-blocks 28, these blocks being adapted for vertical movement in the guide-ways 27, the shaft 31 being connected by radius rods 32 to the main trailer shaft 11 and adapted for arcuate movement relative to said shaft 11, the elongated slots 33 formed in the bearing-blocks permitting compensation for the movement of the shaft 31, when the rotor 17 is raised or lowered.

The cross-head bearing-blocks are pivotally connected at 34 to the upstanding arms 35 bearing rack sections 36 at their upper ends adapted to mesh with pinions 37 mounted upon shaft 38, which is borne by bearings 39 formed at the upper ends of the brackets 18, the rack arms 35 being held in contact with the pinions 37 by means of saddles 40 positioned to bear against the edges of these arms, while allowing free vertical movement thereof.

The mechanism for raising and lowering the rotor comprises a hand-wheel 42 mounted at one side of the machine upon the stub-shaft 43 bearing a pinion 44 adapted to mesh with a gear 45 mounted upon the outer end of shaft 38, so that the movement of the hand-wheel in one direction causes the rack arm 35, carrying the rotor, to be raised, while movement thereof in the opposite direction causes the lowering of the rotor relative to the frame 1.

The rotor is driven, in the direction of travel, by means of a shaft 46 mounted in bearings 47 secured to the side members 2 and 3, and sprocket-wheels 48 connected to the rotor sprocket-wheels 49 by sprocket-chains 50. The shaft 46 is connected to the power unit 51 by means of a sprocket wheel 52 mounted upon the crank-shaft thereof and a sprocket wheel 53 mounted upon said shaft 46 and connected with the power unit sprocket 52 by a chain 54. It is obvious that, as arranged, the rotor may be raised entirely clear of the ground for transportation of the trailer from one field to another through manipulation of the hand-wheel, or through like manipulation, it may be adjusted to take a cut of a depth to meet varied requirements.

As is shown in Figure 1, the rotor is somewhat shorter than the width of the frame, and is provided with a plurality of reversely arranged sets of helicoidal-shaped cutters 55, such as is described in my previously mentioned co-opending application. The rear wheels 9 and 10 are set in somewhat from the ends of the rotor, so that they may at all times, as before stated, run on unplowed ground, thereby avoiding heavy going through yielding freshly plowed grounds.

Having thus described my invention, I claim, and desire to secure by Letters Patent:

A tractor trailer and combination power unit for rotary soil pulverizers comprising, in combination, a trailer-frame having a main axle, supporting wheels mounted upon the axle, a power unit mounted upon said frame, guide-frames comprising brackets disposed at the rear end of said trailer-frame and bearing upwardly extending ribs forming vertical guideways, cross-head bearing-blocks mounted for vertical movement in said guideways and having elongated openings therein, a shaft mounted in said bearing-block openings, radius rods connecting said shaft with the main axle, a rotary pulverizer borne by said shaft and adapted for arcuate movement relative to said axle, driving connections between said power unit and pulverizer shaft, and means for adjusting said pulverizer relative to the ground.

In testimony whereof I have affixed my signature.

HENRY A. FRETTS.